(12) United States Patent
Sahara

(10) Patent No.: US 6,230,358 B1
(45) Date of Patent: May 15, 2001

(54) WIPER BLADE RUBBER FOR WINDSHIELD WIPER HAVING INSIDE HOLLOW

(75) Inventor: Hideshi Sahara, Toyohashi (JP)

(73) Assignee: ASMO Co., Ltd., Kosai (JP)

( * ) Notice: Subject to any disclaimer, the term of this patent is extended or adjusted under 35 U.S.C. 154(b) by 0 days.

(21) Appl. No.: 09/098,359

(22) Filed: Jun. 16, 1998

(30) Foreign Application Priority Data

Jun. 18, 1997 (JP) .................................................. 9-177757

(51) Int. Cl.⁷ .................................................. B60S 1/04
(52) U.S. Cl. .................................................. 15/250.48; 15/245
(58) Field of Search .................................. 15/250.48, 250.41, 15/250.4, 250.04, 245, 250.43

(56) References Cited

U.S. PATENT DOCUMENTS

| | | |
|---|---|---|
| 3,566,432 | * 3/1971 | Quinlan et al. . |
| 3,636,583 | * 1/1972 | Rosen . |
| 3,785,002 | * 1/1974 | Quinlan et al. . |
| 4,473,919 | * 10/1984 | Fritz, Jr. . |

FOREIGN PATENT DOCUMENTS

| | | |
|---|---|---|
| 2085288A | * 4/1982 | (GB) . |
| 2-162142 | 6/1990 | (JP) . |
| 2-130858 | 10/1990 | (JP) . |

* cited by examiner

*Primary Examiner*—Deborah Jones
*Assistant Examiner*—Jennifer McNeil
(74) *Attorney, Agent, or Firm*—Fish & Richardson P.C.

(57) ABSTRACT

A wiper blade rubber for a windshield wiper has a holding portion held by a plurality of supporting members, a wiping portion for wiping the surface of a windshield and a connecting portion connecting the holding portion and the wiping portion. The connecting portion is narrowed in a middle part thereof providing a neck portion, and has an inside hollow. The hollow extends vertically in the neck portion and horizontally above the neck portion, with respect to the windshield, thereby having a T-shaped cross-section in the connecting portion. Preferably, the hollow extends into the wiping portion. Therefore, when the wiper blade rubber turns over the inclining direction of the wiping portion, the wiper blade rubber can suppress changes in the height of the wiper blade rubber by deforming the hollow, while keeping an appropriate inclining angle of the wiping portion.

24 Claims, 2 Drawing Sheets

WIPER BLADE RUBBER FOR WINDSHIELD WIPER HAVING INSIDE HOLLOW

CROSS-REFERENCE TO RELATED APPLICATION

This application relates to and incorporates herein by reference Japanese Patent Application No. 9-177757 filed on Jun. 18, 1997.

BACKGROUND OF THE INVENTION

1. Field of the Invention

The present invention relates to a wiper blade rubber for a windshield wiper which turns back and forth on the windshield of a vehicle.

2. Related Art

A conventional windshield wiper for wiping the windshield of a vehicle has a wiper blade rubber. The wiper blade rubber is inclined against the windshield while wiping the windshield so that the windshield is wiped effectively. The wiper blade rubber has a neck portion having a narrowed shape, and a wiping portion connecting to the neck portion. When the wiper blade rubber wipes the windshield, the neck portion is bent so that the wiping portion is inclined, leading to an effective wiping.

Further, the conventional windshield wiper turns back and forth. Therefore, when the windshield wiper turns over, an inclining direction of the wiping portion against the windshield is also reversed while changing the height of the wiper blade rubber from the windshield. Specifically, the inclining direction of the wiping portion is reversed with a top end of the wiping portion as a center. The top end of the wiping portion contacts the windshield surface to be wiped. Therefore, the height of the wiper blade rubber is maximum when the wiping portion stands upright during changing of the inclining direction, and is minimum when the wiping portion is inclined to a maximum degree. However, when the height of the wiper blade rubber changes, a harsh noise may sounds.

To decrease the noise, JP-A-2-162142 proposes to form an arc portion in a wiper blade rubber so that the inclining direction of a moving portion (i.e., wiping portion) is turned over smoothly using the arc portion. However, in the wiper blade rubber according to JP-A-2-162142, the moving portion and a fixed portion of the wiper blade rubber may slide in a lateral direction, resulting in that the moving portion fails to be inclined.

SUMMARY OF THE INVENTION

It is an object of the present invention to provide a wiper blade rubber which suppresses changes in the height of the wiper blade rubber when the inclining direction of the wiper blade rubber is reversed, while keeping a wiping portion of the wiper blade rubber being inclined appropriately.

According to the present invention, a wiper blade rubber has a holding portion being held by a supporting member, a wiping portion for wiping the windshield of a vehicle and a connecting portion for connecting the holding portion and the wiping portion. The connecting portion has a neck portion having a narrowed cross-section, and has an inside hollow. The hollow extends vertically in the neck portion and horizontally above the neck portion, with respect to the windshield, thus having a T-shaped cross-section. Therefore, the connecting portion is readily bent due to the neck portion so that the wiping portion is inclined. Further, the connecting portion is readily deformed vertically with respect to the windshield due to the hollow. Therefore, the wiper blade rubber can suppress changes in the height of the wiper blade rubber when turning over the inclining direction of the wiper blade rubber, reducing a harsh noise generated due to friction between the wiper blade rubber and the windshield.

Preferably, the wiping portion has a shoulder portion for limiting the inclining angle of the wiping portion. When the wiping portion is inclined during wiping, the shoulder portion touches the connecting portion so that the wiping portion is inclined at an appropriate angle.

BRIEF DESCRIPTION OF THE DRAWINGS

These and other objects and features of the present invention will become more readily apparent from a better understanding of the preferred embodiments described below with reference to the accompanying drawings, in which.

DETAILED DESCRIPTION OF THE PREFERRED EMBODIMENTS

Embodiments of the present invention will be described hereinafter with reference to the accompanying drawings.

(First Embodiment)

Figure 1A:
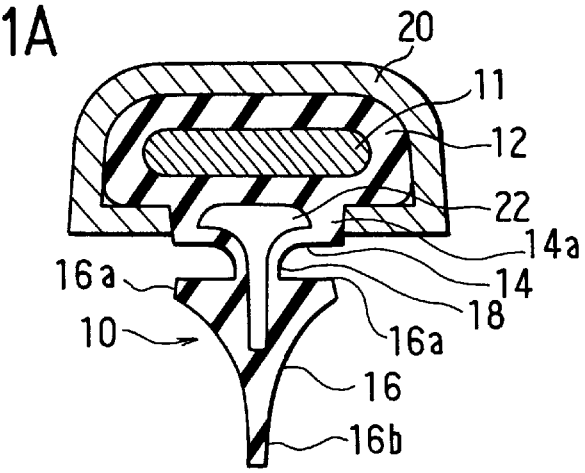
FIG. 1A is a cross-sectional view showing a wiper blade rubber in a first embodiment of the present invention.

As shown in FIG. 1A, a wiper blade rubber 10 has a holding portion 12, a connecting portion 14 and a wiping portion 16. These portions are elongated and integrally formed. The holding portion 12 is held by a plurality of supporting members 20 at a plurality of points disposed in a longitudinal direction of the holding portion 12. The supporting members 20 are part of a wiper blade connector (not shown) and are connected to a wiper arm (not shown) through the wiper blade connector. Therefore, when the wiper arm moves arcuately, the wiper blade rubber 10 moves arcuately as well.

The holding portion 12 contains a backing 11 therein extending in a longitudinal direction thereof to provide reinforcement. Due to the backing 11, pressure (i.e., wiper arm pressure) incurred by the holding portion 12 is dispersed in a longitudinal direction of the holding portion 12. The wiping portion 16 has a pair of shoulder portions 16a and an edge portion 16b. The wiping portion 16 is formed in substantially a triangle shape. The edge portion 16b of the wiping portion 16 is thinned to improve wiping performance of the wiper blade rubber 10.

The connecting portion 14 has a base portion 14a which extends from the holding portion 12 and a neck portion 18. The neck portion 18 which extends from the base portion 14a becomes thinner gradually and is thickened again toward the shoulder portions 16a to have a narrowed cross-section, as shown in FIG. 1A. The base portion 14a and the wiping portion 16 are connected by the neck portion 18. The neck portion 18 can be bent readily due to its reduced thickness. Therefore, the wiping portion 16 can be readily inclined by the bending of the neck portion 18.

The connecting portion 14 has an inside hollow 22. The hollow 22 extends in the horizontal direction in FIG. 1A in the base portion 14a, and in the vertical direction in FIG. 1A in the neck portion 18 so that the hollow 22 has a T-shaped cross-section. Further, the hollow 22 extends downward (i.e., toward the edge portion 16a) leading to the wiping portion 16. In the joint area between the base portion 14a and the neck portion 18 the connecting portion 14 is gently curved in section. The hollow 22 is gently curved corresponding to a gentle curve of an outline of the connecting portion 14 so that the neck portion 18 has a substantially uniform thickness. Further, the whole connecting portion 14 has a circular sectional shape facing the hollow 22. Therefore, the connecting portion 14 can be deformed continuously while preventing stress from being applied intensively due to deformation.

Further, the width of a cross-section of the hollow 22 in the base portion 14a in the horizontal direction in FIG. 1A is larger than the width of a cross-section of the neck portion 18 in the horizontal direction in FIG. 1A. This enables the neck portion 18 to be readily deformed in the vertical direction in FIG. 1A. Furthermore, the hollow 22 in the base portion 14a has an acute angle on the side of the connecting portion 14. This also enables the neck portion 18 to be readily deformed in the vertical direction in FIG. 1A.

Thus, the neck portion 18 can be bent readily due to the hollow 22 formed inside of the neck portion 18. Further, the connecting portion 14 can also be deformed in the vertical direction in FIG. 1A because of the hollow 22 formed inside of the base portion 14a.

Figure 1B:
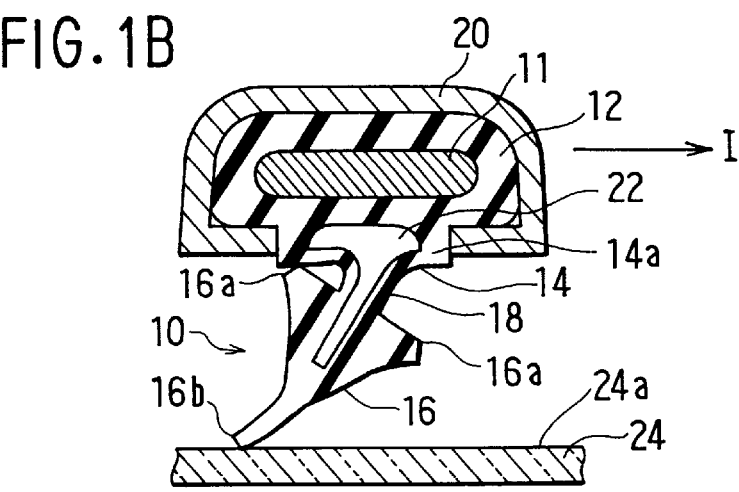
FIG. 1B is a cross-sectional view showing the wiper blade rubber while wiping a windshield in the first embodiment.

Next, an operation of the wiper blade rubber 10 will be explained specifically. As shown in FIG. 1B, when the wiper arm (not shown) moves arcuately, the wiper blade rubber 10 moves as the supporting member 20 connected to the wiper arm moves in the direction indicated by arrow I. The wiping portion 16 of the wiper blade rubber 10 wipes a surface 24a to be wiped of a windshield 24.

During this wiping, the wiping portion 16 is inclined so that the edge portion 16b is left behind with respect to a moving direction of the holding portion 12. This inclining of the wiping portion 16 is made possible by deformation of the connecting portion 14. That is, the wiping portion 16 is inclined by the bending of the neck portion 18 of the connecting portion 14. The hollow 22 formed inside the connecting portion 14 enables the neck portion 18 to bend more readily.

Further, the whole connecting portion 14 can also be bent readily because the hollow 22 extends in not only neck portion 18 but also the base portion 14a. Thus, the wiping portion 16 can be readily inclined by the bending of the whole connecting portion 14.

Furthermore, the shoulder portion 16a of the wiping portion 16 touches the lower end of the base portion 14a of the connecting portion 14, limiting the inclining angle of the wiping portion 16. Therefore, the wiping portion 16 can be inclined at an appropriate angle.

Figure 1C:
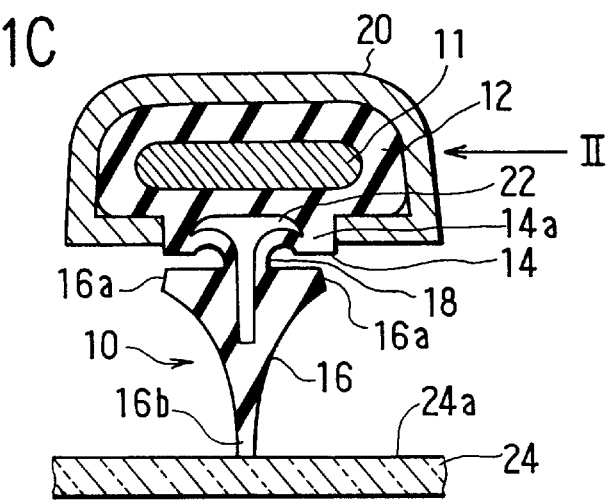
FIG. 1C is a cross-sectional view showing the wiper blade rubber while turning over its inclining direction in the first embodiment.

Next, as shown in FIG. 1C, when the wiper arm turns over while moving back and forth, the connecting portion 14 of the wiper blade rubber 10 is deformed in the vertical direction in FIG. 1C. Specifically, the connecting portion 14 is deformed so that the neck portion 18 is inserted inside the base portion 14a. This is made possible by the hollow 22 extending in the horizontal direction in FIG. 1C in the base portion 14a.

Thus, the connecting portion 14 can suppress changes in the height of the wiper blade rubber 10. That is, the height of the wiper blade rubber 10 is tentatively increased when inclining direction of the wiper blade rubber 10 is turned over. However, the changes in the height of the wiper blade rubber 10 can be decreased by the connecting portion 14. This reduces a harsh noise when the wiper blade rubber 10 turns over the inclining direction.

In the first embodiment, the neck portion 18 is greatly deformed when the wiper blade rubber 10 turns over the inclining direction. Therefore, if snow is filled in a recess existing around the neck portion 18, snow can be removed readily when the wiper blade rubber 10 turns over the inclining direction. When a surface of the neck portion 18 has a repellency, snow can be removed more readily.

(Second Embodiment)

As shown in FIG. 2, similarly to the first embodiment, a wiper blade rubber 30 has a holding portion 32, a connecting portion 34 and a wiping portion 36. The connecting portion 34 has a neck portion 38. A hollow 42 is formed extending both inside the connecting portion 34 and the wiping portion 36. The holding portion 32 is held by a plurality of supporting members 40. The holding portion 32 and the supporting members 40 respectively have the same structures as the holding portion 12 and the supporting members 20 in the first embodiment. The wiping portion 36 operates substantially similarly to the wiping portion 16 in the first embodiment although a shoulder portion 36a is more sloping in section compared to the shoulder portion 16a. The neck portion 38 also operates substantially similarly to the neck portion 18 in the first embodiment although the neck portion 38 has a more roundish sectional shape compared to the neck portion 18 due to the shape of the shoulder portion 36a.

Figure 2A:
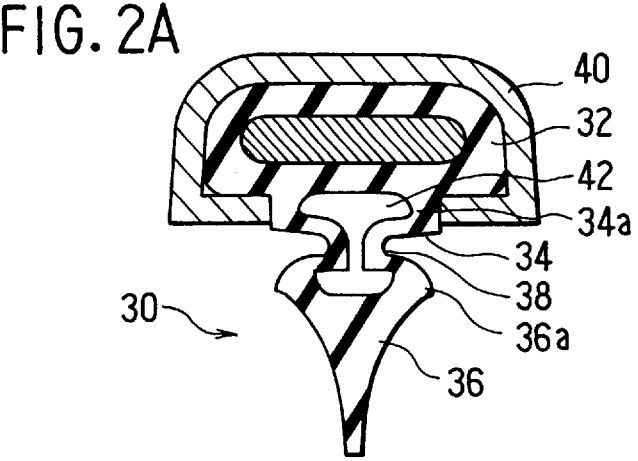
FIG. 2A is a cross-sectional view showing a wiper blade rubber in a second embodiment of the present invention.

In the second embodiment, a shape of the hollow 42 is different from the shape of the hollow 22 in the first embodiment. As shown in FIG. 2A, the hollow 42 extends in the horizontal direction in FIG. 2A in the base portion 34a, and extends in the vertical direction in FIG. 2B in the neck portion 28. The hollow 42 further extends downward to the wiping portion 36. In the second embodiment, the hollow 42 extends in the horizontal or lateral direction in the wiping portion 36. Therefore, the hollow 42 is narrowed in the middle corresponding to the outline of the neck portion 38.

Figure 2B:
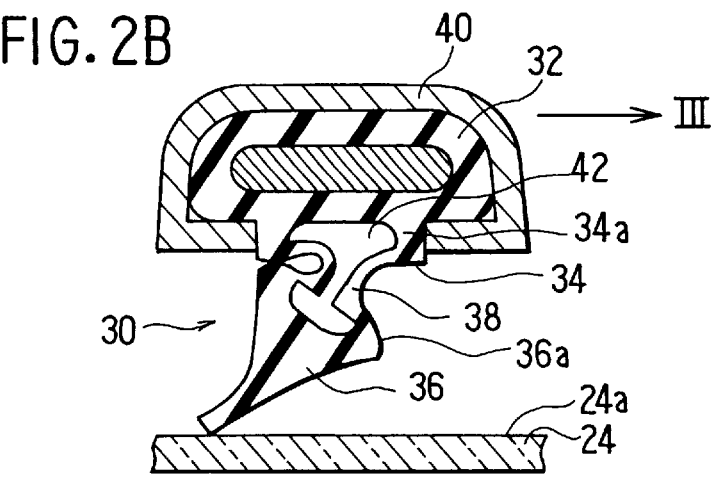
FIG. 2B is a cross-sectional view showing the wiper blade rubber while wiping a windshield in the second embodiment.

According to the second embodiment, the connecting portion 34 can be readily bent at the neck portion 38. Therefore, as shown in FIG. 2B, when the wiping portion 36 wipes the surface 24a to be wiped of a windshield 24, the wiping portion 36 is readily inclined by the bending of the neck portion 38. Moreover, the neck portion 38 can be readily bent due to the hollow 42.

Figure 2C:
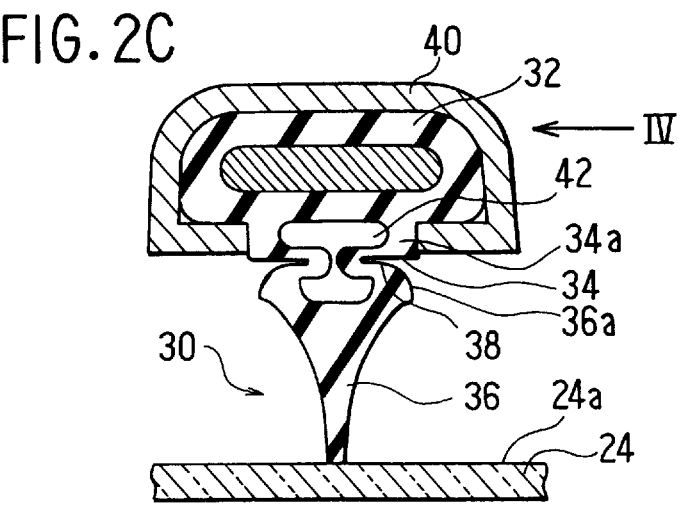
FIG. 2C is a cross-sectional view showing the wiper blade rubber while turning over its inclining direction in the second embodiment.

Further, the connecting portion 34 can also be deformed in the vertical direction in FIG. 2C because the hollow 42 is narrowed in the middle and can be crushed in the vertical direction in FIG. 2C when the wiper blade rubber 30 turns over the inclining direction. Furthermore, the hollow 42 in the wiping portion 36 has an acute angle on the side of the connecting portion 34. This enables the connecting portion 34 to be readily deformed in the vertical direction in FIG. 2C. Thus, changes in the height of the wiper blade rubber 30 can be suppressed to reduce a harsh noise. Other effects of the wiper blade rubber 30 in the second embodiment are the same as those of the wiper blade rubber 10 in the first embodiment.

In the above-described embodiments, the shoulder portions 16a, 36a of the wiping portions 16, 36 may or may not touch the base portion 14a, 34a of the connecting portion 14, 34, respectively, while the wiper blade rubber 10, 30 wipes the windshield 24. However, even if the shoulder portions 16a, 36a do not touch the base portion 14a, 34a, harsh noise can be reduced.

Although the present invention has been fully described in connection with preferred embodiments thereof with reference to the accompanying drawings, it is to be noted that various changes and modifications will become apparent to those skilled in the art.

Such changes and modifications are to be understood as being within the scope of the present invention as defined by the appended claims.

What is claimed is:

1. A wiper blade rubber for a windshield wiper having a supporting member, for wiping a windshield of a vehicle, said wiper blade rubber comprising:
   a holding portion being held by said supporting member;
   a wiping portion for wiping a surface of said windshield; and
   a connecting portion connecting said holding portion and said wiping portion, said connecting portion having a base portion and a neck portion,
   said base portion coupled to said holding portion, and said neck portion having a narrowed cross-section, said neck portion disposed between said base portion and said wiping portion, wherein a width of said neck portion is smaller than widths of said base portion and top of said wiping portion,
   said connecting portion having a hollow inside, said hollow inside extending vertically in said neck portion and horizontally in said base portion above said neck portion, to have a T-shaped cross-section in said connecting portion,
   wherein a width of said cross-section in said base portion is wider than a width of said cross-section of said neck portion.

2. The wiper blade rubber of claim 1, wherein:
   said hollow inside corresponds to an outer shape of said base portion and said neck portion, said neck portion having a substantially uniform thickness.

3. The wiper blade rubber of claim 2, wherein:
   said base portion curves in section toward said neck portion.

4. The wiper blade rubber of claim 2, wherein:
   said connecting portion has a circular sectional shape facing said hollow inside at a connection between said base portion and said neck portion.

5. The wiper blade rubber of claim 1, wherein:
   said inside hollow in said base portion has an acute angle on the side of said neck portion.

6. The wiper blade rubber of claim 1, wherein:
   said hollow inside extends into said wiping portion, and
   said hollow inside in said connecting portion narrows in a middle part thereof corresponding to an outline of said neck portion.

7. The wiper blade rubber of claim 6, wherein:
   said connecting portion curves in section from the bottom side of said holding portion to said wiping portion to form said neck portion.

8. The wiper blade rubber of claim 6, wherein:
   said connecting portion has a circular sectional shape facing said hollow inside from a lower side of said holding portion to said wiping portion.

9. The wiper blade rubber of claim 6, wherein;
   said hollow above said neck portion has an acute angle on the side of said neck portion.

10. The wiper blade rubber of claim 6, wherein;
    said wiping portion includes a shoulder portion capable of touching said connecting portion when said wiping portion is inclined, thereby limiting an inclining angle of said wiping portion.

11. The wiper blade rubber of claim 1, wherein:
    said wiping portion has a substantially triangular cross-section including a shoulder portion extending from a first vertex to a second vertex of said triangular cross-section, and an edge portion disposed at a third vertex of said triangular cross-section, said shoulder portion facing the holding portion; and
    said neck portion is disposed between said base portion and said shoulder portion.

12. The wiper blade rubber of claim 1, wherein;
    said wiping portion includes a shoulder portion capable of touching said connecting portion when said wiping portion is inclined, thereby limiting an inclining angle of said wiping portion.

13. A wiper blade rubber for a windshield wiper having a supporting member, for wiping a windshield of a vehicle, said wiper blade rubber comprising:
    a holding portion held by said supporting member;
    a wiping portion for wiping a surface of said windshield; and
    a connecting portion connecting said holding portion and said wiping portion, said connecting portion extending from said holding portion to said wiping portion,
    said connecting portion having
    a neck portion with a narrowed cross-section, wherein a width of said neck portion is smaller than widths of said holding portion and top of said wiping portion,
    said connecting portion and said wiping portion having a hollow inside extending therebetween,
    said hollow in said connecting portion narrowing in a middle part thereof corresponding to an outline of said neck portion,
    said hollow inside extending horizontally in the connecting portion above said neck portion, vertically in said neck portion and horizontally in said wiping portion,
    wherein a width of a cross-section of said hollow inside above said neck portion is wider than a width of a cross-section of said neck portion.

14. The wiper blade rubber of claim 13, wherein;
    said hollow above said neck portion has an acute angle on the side of said neck portion.

15. The wiper blade rubber of claim 13, wherein;
    said hollow in said wiping portion has an acute angle on the side of said connecting portion.

16. The wiper blade rubber of claim 13, wherein;
    said wiping portion includes a shoulder portion capable of touching said connecting portion when said wiping portion is inclined, thereby limiting an inclining angle of said wiping portion.

17. The wiper blade rubber of claim 13, wherein:
    said wiping portion has a substantially triangular cross-section including a shoulder portion extending from a first vertex to a second vertex of said triangular cross-section, and an edge portion disposed at a third vertex of said triangular cross-section, said shoulder portion facing the holding portion; and said neck portion is disposed between a base portion and said shoulder portion.

18. A wiper blade rubber for a windshield wiper having a supporting member, for wiping a windshield of a vehicle, said wiper blade rubber comprising:

a holding portion shaped to be held in said supporting member and having a first hollow inside extending laterally in section at a lower side thereof;

a wiping portion for wiping a surface of said windshield; and a neck portion extending from said lower side of said holding portion and said wiping portion disposed perpendicular to a plane formed by said first hollow inside, said neck portion having a second hollow inside extending from said first hollow inside toward said wiping portion, wherein a width of said neck portion is smaller than widths of said lower side of said holding portion and top of said wiping portion, wherein a cross-sectional width of said first hollow inside is larger than a cross-sectional width of an outermost part of said neck portion thereby enabling said wiping portion to move in a direction in which said second hollow inside extends, said wiping portion has a substantially triangular cross-section including a shoulder portion extending from a first vertex to a second vertex of said triangular cross-section, and an edge portion disposed at a third vertex of said triangular cross-section, said shoulder portion facing the holding portion; and said neck portion is disposed between a base portion and said shoulder portion.

19. The wiper blade rubber of claim 18, wherein said wiping portion has a third hollow inside extending from said second hollow inside.

20. The wiper blade rubber of claim 19, wherein said third hollow inside extends laterally in section substantially parallel with said first hollow inside.

21. The wiper blade rubber of claim 18, wherein said neck portion is provided outside of a lower part of said supporting member, and said first hollow inside is formed in line with said lower part of said supporting member.

22. The wiper blade rubber of claim 18, wherein said first hollow inside and said second hollow inside have a continuously curved surface at a connection therebetween.

23. The wiper blade rubber of claim 22, wherein said first hollow inside has continuously curved corners at upper lateral sides thereof and acutely angled corners at lower lateral sides thereof.

24. A wiper blade rubber for a windshield wiper having a supporting member, for wiping a windshield of a vehicle, said wiper blade rubber comprising:

a holding portion held by said supporting member;

a wiping portion for wiping a surface of said windshield; and a connecting portion connecting said holding portion and said wiping portion, said connecting portion extending from said holding portion to said wiping portion, said connecting portion having:
a neck portion with a narrowed cross-section,
wherein a width of said neck portion is smaller than widths of said holding portion and top of said wiping portion, said connecting portion and said wiping portion having a hollow inside extending therebetween, said hollow in said connecting portion narrowing in a middle part thereof corresponding to an outline of said neck portion, said hollow inside extending horizontally in the connecting portion above said neck portion, vertically in said neck portion and horizontally in said wiping portion.

* * * * *